March 3, 1931.  R. MARCHIANO  1,794,633

GAS METER

Filed March 31, 1927  2 Sheets-Sheet 1

R. Marchiano, Inventor
By Marks & Clerk, Attys.

March 3, 1931. R. MARCHIANO 1,794,633
GAS METER
Filed March 31, 1927   2 Sheets-Sheet 2

R. Marchiano
Inventor
By Marks & Clark
Attys.

Patented Mar. 3, 1931

1,794,633

UNITED STATES PATENT OFFICE

RINALDO MARCHIANO, OF GENOA, ITALY

GAS METER

Application filed March 31, 1927, Serial No. 179,998, and in Italy October 26, 1926.

The present invention refers to an improved gas-meter which is able to reliably work at variable gas pressure at low pressure conditions as well as at high pressure conditions and by which unauthorized operation of and tampering with the meter are prevented and even the smallest gas losses are accurately recorded.

The above and additional objects are accomplished by such means as are illustrated in the preferred embodiment of the invention shown in the accompanying drawing in which Fig. 1 is a front elevation of the improved gas-meter with the front wall taken off;

Figure 1:
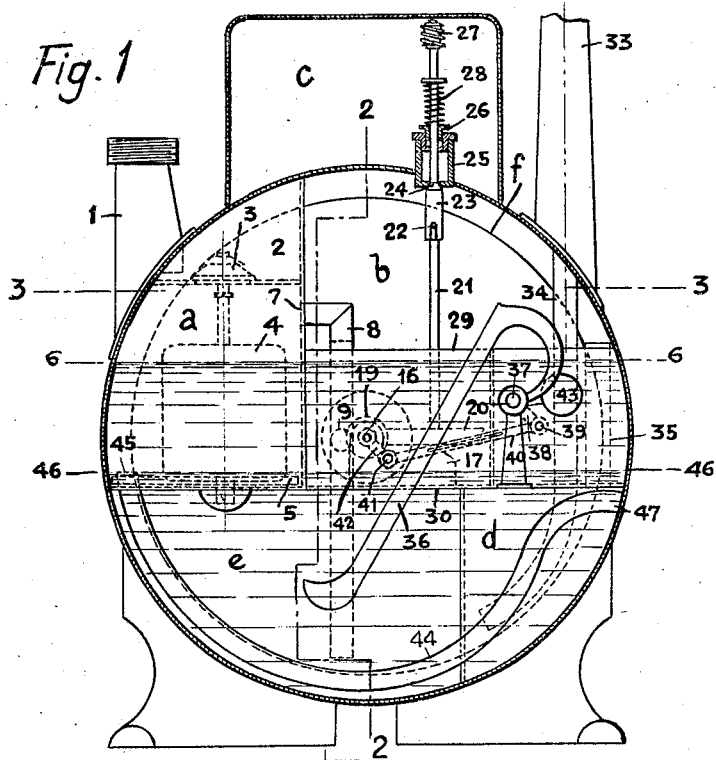
Figure 2:
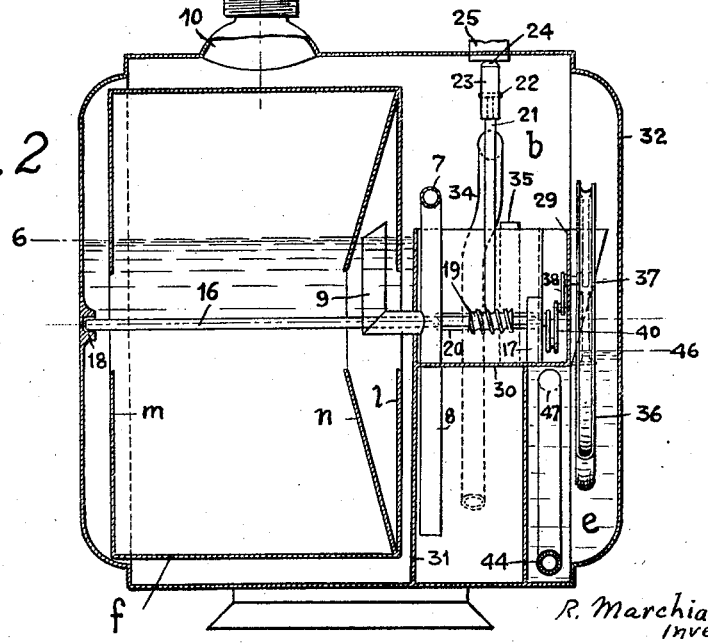
Fig. 2 is a vertical sectional view on line 2—2 of Fig. 1.
Figure 3:
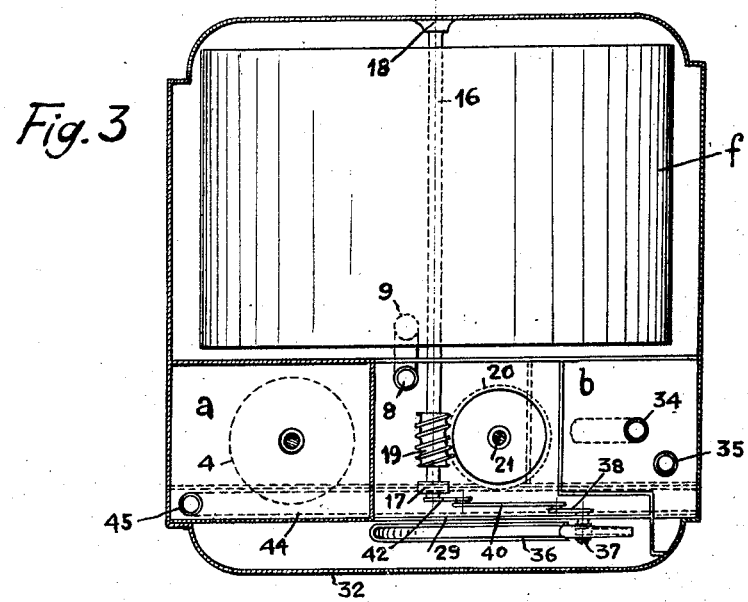
Fig. 3 is a horizontal sectional view across the gas-meter on line 3—3 of Fig. 1.

In these figures the gas enters through the admission socket 1 in the chamber 2 in which is arranged the inlet valve 3 operated by the float 4 arranged in the distributing float chamber $a$. 5 is a horizontal opening in one of the walls of the float chamber $a$ by which the water of the space of the chamber $a$ communicates with the water of the measuring space $b$ in which is arranged the revolving drum $f$. By the separation of the float chamber $a$ from the measuring space $b$, injurious oscillations and blows, likely to occur in the measuring space, are not transmitted to the inlet valve 3. The float 4 and the revolving drum $f$ are immersed in the water, the common water level being indicated by the line 6—6.

From an opening 7 of the float chamber $a$ the gas flows through the descending pipe 8 in the siphon 9 and then arrives within the revolving drum $f$. After having passed the drum and after being measured the gas leaves the meter through the gas outlet socket 10.

Figure 4:
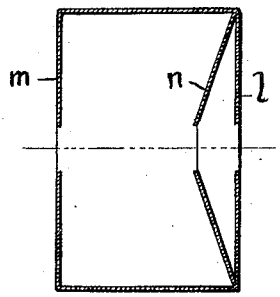
Figures 4, 5, 6 and 7 are a sectional view and perspective views respectively of the revolving drum of the meter.

Fig. 4 is a sectional view of the revolving drum without its inner parts. The drum includes two end walls $l$ and $m$ and a conical wall $n$.

Figure 5:
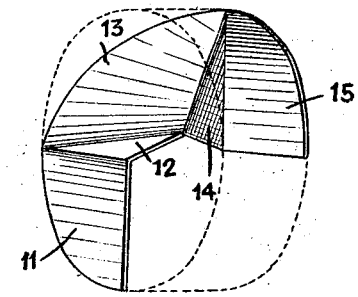

Fig. 5 is a detail in perspective view of one of the four blade like members seen from the wall $n$ which blades form the inner parts of the drum and which connect the wall $n$ with the wall $m$. This member consists in a sector of a circle 11 which is arranged in the wall $n$ of Fig. 4; the sector 11 connects immediately with the strongly inclined triangular wall 12, at its turn connected with a sector like wall of less inclination 13. The wall 13 connects further with a more inclined wall piece 14 and this latter wall is in its turn connected with a sector 15 situated in the plane of the wall $m$ (Fig. 4) so that the sector 15 assumes its position diametrically opposite the sector 11 in the plane of the wall $n$.

In arranging four division walls (11, 12, 13, 14, 15) distributed uniformly on the circumference of the drum there are obtained four radially directed cuts upon the end wall $n$ which are for the inlet and four radially directed cuts upon the end wall $m$ which are arranged for the exit of the gas.

Figure 6:
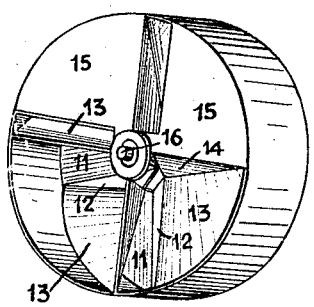

Fig. 6 is a perspective view of the revolving drum looking toward the wall $m$ in which view two sectors 15 are omitted so as to better illustrate the inside of the blades.

Figure 7:
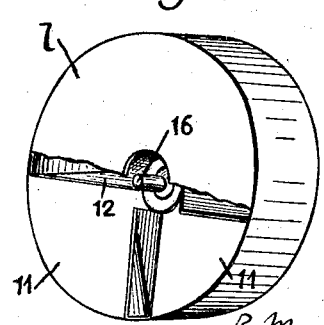

Fig. 7 is a perspective view of the revolving drum looking toward the wall $l$ and in which view a part of the wall $l$ is broken off.

The gas which enters the revolving drum through the inclined mouth piece of the tube 9, passes the interspaces formed by two successive blades and puts the drum in rotation. This rotation is transmitted to the tachometer in the chamber $c$. The blades present such a particular conformation that the water encounters the least resistance in traversing the drum. The effect of the immediate admission of the gas from the distributing float chamber $a$ within the drum is that almost the total gas volume contained in the meter has already been measured with the exception of a small quantity in the chamber 2 and in the float chamber $a$, whilst in the known meters large quantities of gas stored within the meter are not measured. The drum is of small dimensions and of a very small weight so that a very slight friction in the bearings and the least wear of these moving parts has to be considered. It is also possible to rotate the drum with the speed required by the requirements of the gas consumption.

The shaft 16 of the revolving drum is supported at one side in a bearing 17 and at the other side in the bearing 18. A worm 19 fastened on the shaft 16 transmits the rotating motion to the worm wheel 20 arranged on the vertical shaft 21; this shaft carries at its upper end a pin 22 by means of which this shaft is coupled with the shaft 23. The shaft 23 has a conical terminal 24, which tightly engages a corresponding seat of the sleeve 25. The shaft 23 extends through this sleeve and is supported at the upper end of the sleeve within a stuffing box 26 supplied with a stuffing disk of leather. 27 is a worm arranged at the upper end of the shaft 23, by means of which is operated the tachometer which records the delivered gas quantity. 28 is a spiral spring which tends to keep the shoulder 24 of the shaft 23 against the corresponding seat of the sleeve 25. By the last described device the gas or the water is prevented from entering the tachometer and in applying this device the tachometer may be immediately applied upon the outer wall of the gas-meter.

The upper end of the tube 9 presents an inclined mouthpiece and the lowest point of this mouthpiece is situated on the line 6—6 of the water level. By this disposition the gas immediately reaches the revolving drum whilst the tube 9 serves at the same time as an overflow; the overflowing water is admitted through the descending tube 8 within the compensation chamber $e$ which has to contain the required quantity of water of compensation. This compensation chamber is limited by the bridge 29, the wall 30, the vertical wall 31 and the wall of the chamber $d$ and partially by the cover 32.

The water is admitted in the gas-meter by the admission socket 33; the same reaches through the pipe 34 the closed chamber $d$ and is obliged to ascend in the tube 35 which has its outlet opening about 10 mm. above the water level 6—6.

In order to prevent a diminution of water in the measuring chamber $b$ due to vaporization, this chamber is supplied with the known compensation spoon 36 formed by a grooved lever arranged on the meter outside the bridge 29. This spoon performs an oscillating movement about the fulcrum 37 so that the free end of the spoon in its lowest position immerses in the water of the receptacle $e$ and allows the water to flow over the bridge 29 within the measuring space $b$ in its elevated position. The oscillation is thus imparted to the spoon 36 that the latter by means of the arm 38 is jointly connected at 39 with the driving rod 40, which is coupled at 41 with the crank 42 keyed on the shaft 16 of the revolving drum. 43 is a counter-weight to balance the weight of the spoon during its movement. By this latter device at each rotation of the revolving drum to the measuring water is adjoined a certain quantity of water so that the water level is permanently kept at the same height, whilst the exceeding water quantity can be discharged across the inclined mouthpiece of the tube 9 and return by the descending pipe 8 within the compensation chamber. In order to further prevent the water in the compensation chamber exceeding a certain level, an overflow pipe 44 is provided having the one end 45 arranged at the height of the line 46—46 and the other end 47 slightly below the line 46—46 and connected with the outer wall of the meter so that the tube 44 works as an overflow with hydraulic seal in the chamber $e$.

With the gas-meter of the present invention unauthorized subtractions of gas are rendered impossible as if such a subtraction should be performed the same will always be effected in subtracting a gas which has already been measured.

Having thus described my invention I claim:

In a gas meter a revolving measuring drum including a cylindrical casing and end walls divided by cuts at right angles to each other into four circular sectors, the cuts on the one end wall being utilized for the admission and those on the other end wall for the exit of the gas, division walls connecting each circular sector at the admission end with the diagonally opposite sector at the exit end, said division walls being divided by two intersecting lines into three sections, the middle section having the shape of an elliptical sector, the extreme peripherical points of which correspond with the extreme peripherical points of the circular sectors and in which the remaining sections are substantially of triangular form.

In testimony whereof I have signed my name to this specification.

RINALDO MARCHIANO.